(12) United States Patent
Bohn et al.

(10) Patent No.: US 7,283,122 B2
(45) Date of Patent: Oct. 16, 2007

(54) INPUT DEVICE INCLUDING A SCROLL WHEEL ASSEMBLY

(75) Inventors: David D Bohn, Fort Collins, CO (US);
James Y Koo, Renton, WA (US);
Matthew Pedersen, Seattle, WA (US);
Eric J Wahl, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 146 days.

(21) Appl. No.: 11/167,286

(22) Filed: Jun. 28, 2005

(65) Prior Publication Data
US 2006/0290671 A1    Dec. 28, 2006

(51) Int. Cl.
*G09G 5/00* (2006.01)
(52) U.S. Cl. .................. 345/156; 345/164; 345/160; 345/684

(58) Field of Classification Search ........ 345/156–169, 345/684–687; 348/734; 200/5 A, 6 A; 715/784–786; 463/37–38
See application file for complete search history.

(56) References Cited

U.S. PATENT DOCUMENTS 6,555,768 B2 * 4/2003 Deruginsky et al. ........... 200/4
6,717,572 B1 * 4/2004 Chou et al. .................. 345/157

* cited by examiner

*Primary Examiner*—Lun-Yi Lao
(74) *Attorney, Agent, or Firm*—Banner & Witcoff, Ltd.

(57) ABSTRACT

An input device including a scroll wheel assembly for moving an image in multiple directions on a display screen. The scroll wheel assembly may include a finger-engagable control member that may be endlessly rotated about a rotation axis and a tilt sensor containing a tilt contact member coplanar with the finger-engagable control member and oriented in a substantially vertical, downward orientation such that pivoting of the finger-engagable control member may move the tilt contact member laterally to contact laterally disposed contact switches. In another example, the finger-engagable control member contains a flexible blade at an underside for biasing the scroll wheel assembly to an upright position.

18 Claims, 8 Drawing Sheets

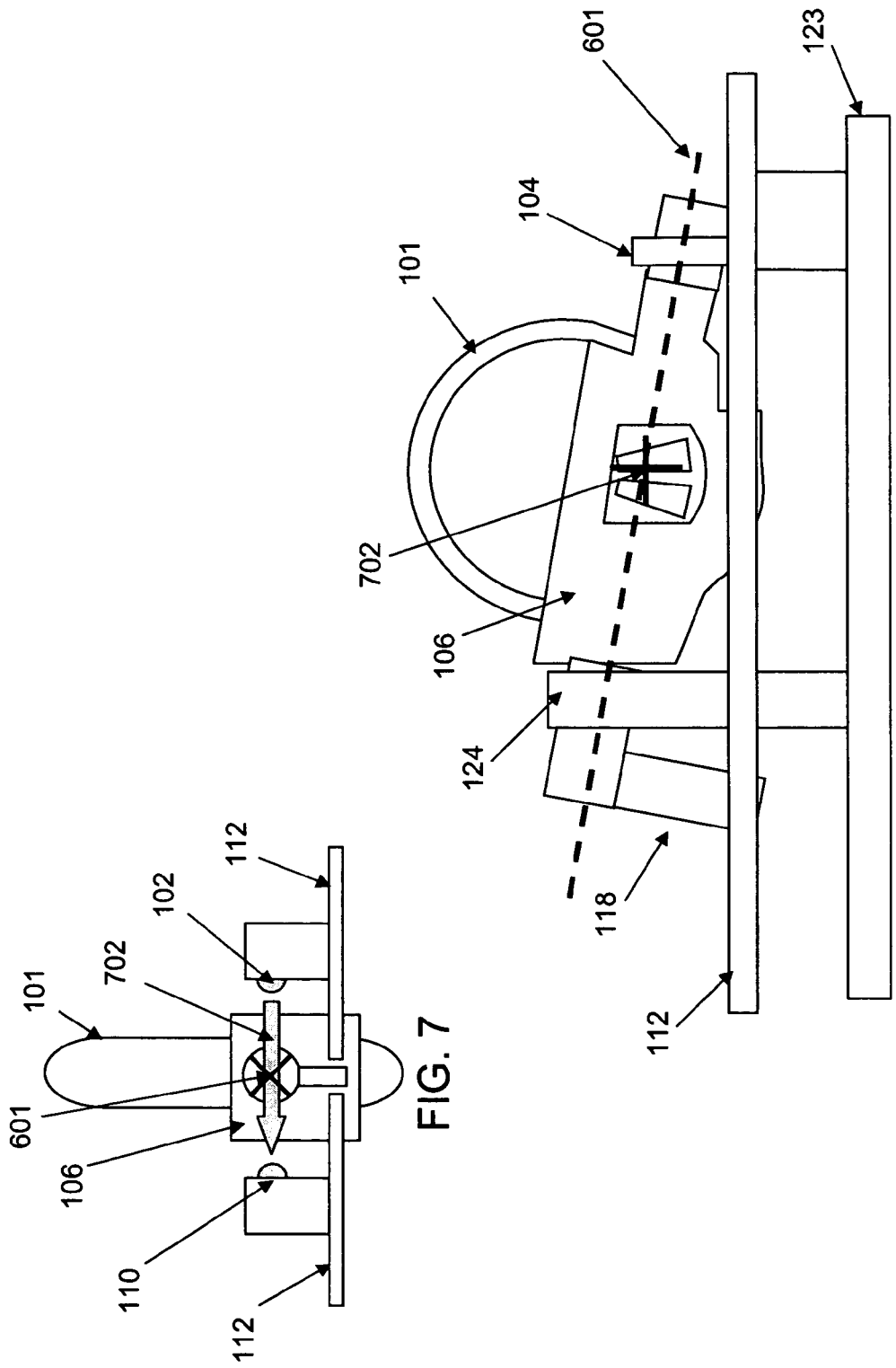

INPUT DEVICE INCLUDING A SCROLL WHEEL ASSEMBLY

BACKGROUND

Scroll wheels have been provided on computer mice and used by computer operators to move an image relative to a display screen of a host computer. A scroll wheel assembly includes a rotatable scroll wheel and a sensor that are typically included in a housing for a peripheral computer device such as a mouse. Typically, a portion of the scroll wheel protrudes upwardly out of an opening in its housing and is rotated in order to vertically scroll the image along the screen.

Scrolling, as used herein, describes the movement of an image relative to a display screen in a particular direction as such term is commonly used in the art. For example, the term "scroll down" as used herein relates to moving the viewable contents of a file (such as a text document or image) relative to display screen by an amount to produce an effect of moving down in the document or image. Similarly, the terms scroll up, scroll left and scroll right relate to moving the viewable contents of a file relative to a screen by an amount to produce an effect of moving in the document or image up, left, and right, respectively. The term scrolling as used herein also includes panning, which is the automatic scrolling of an image.

In operation, a conventional scroll wheel is normally rotated about a first, transversely extending axis secured within a housing in order to scroll the image up and down (vertically) relative to the display screen. As the scroll wheel is rotated, an encoder senses the rotation of an encoder wheel and delivers a corresponding signal to a host computer which in turn can be used to move an image as is known in the art. This can occur without the user moving the position of the mouse and/or the cursor. However, many types of documents, such as spreadsheets, are usually wider than the width of the display screen and the user may want to scroll horizontally across the screen to see the entire file. When the user needs to move the image horizontally across the display screen, the user must typically stop what he or she is doing and perform a number of tedious and potentially frustrating steps. These include locating a graphical user interface in the form of a horizontal scroll bar usually located near the bottom of the display, positioning the cursor on the scroll bar, and then rotating the wheel. Locating the scroll bar can be very difficult for people with bad eyesight, small display screens and/or poor hand-eye coordination. As a result, the user will waste time and delay the completion of his project while fumbling to find the bottom horizontal scroll bar. These delays can cause the user great frustration and unnecessary stress that is magnified when he or she is operating under a deadline.

If the user does not accurately position the cursor over the horizontal scroll bar, the image will not scroll horizontally with respect to the display screen as he or she rotates the wheel. Instead, the image will move vertically relative to the display screen and erroneously change the displayed image. This error will force the user to take additional steps to reposition the desired image on the display screen. These steps include the user confirming that the cursor is not positioned on the horizontal scroll bar and rotating the scroll wheel in the opposite direction to return the image to its previous position. Unfortunately, repositioning an image can lead to errors if the image is being amended. For example, the user may not return the image to its previous position. As a result, he may amend the wrong section of the image. Even if the proper image or portion of an image is returned to the display screen, the user must still attempt to locate the bottom, horizontal scroll bar a second time in order to finally move the image in a horizontal direction.

An existing mouse design includes a first rotatable wheel for scrolling an image up and down, and a second, separate rotatable wheel for scrolling an image left and right. The rotatable wheels are oriented so they extend and rotate in planes that are perpendicular to each other. The two scroll wheels are independently operable. However, this arrangement has drawbacks as the two wheels take up valuable upper surface area on the mouse which could be used for supporting the hand of the user or for additional input keys. Further, the two wheels have been made to be a small size to accommodate both wheels on the upper surface of the mouse. The smaller sized scroll wheels make the scrolling more difficult to control. Additionally, the location of the horizontal scroll wheel is inconvenient for effective control.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

A first illustrative aspect includes an input device for scrolling images on a display in multiple directions. The input device has a housing and a scroll wheel assembly. The scroll wheel assembly includes a finger-engagable rotatable member that is endlessly rotatable about a rotation axis and pivotable about a perpendicular tilting axis. The scroll wheel assembly may further include a tilt sensing system for determining when the finger-engagable rotatable member is pivoted.

In another aspect, the tilt sensing system includes a tilt sensing member or tilt contact member in a midline of the finger-engagable rotatable member and extending in an approximately vertical orientation. When the finger-engagable rotatable member is pivoted in one direction, the tilt sensing member moves laterally in the opposite direction. The tilt sensing member may contact a laterally disposed contact switch. Based on the contact of the tilt sensing member with a laterally disposed contact switch, pivoting of the finger-engagable rotatable member is detected.

In another aspect, a flexible blade is provided to serve as a tilt biasing member. The flexible blade may extend from an underside of the finger-engagable member in a plane that is in the midline and equidistant from the lateral sides of the finger-engagable member. The flexible blade may attach to the underside of the finger-engagable member at a proximal end and may extend at a distal end into a support structure for restricting lateral movement of the flexible blade. Examples of the support structure include but are not limited to a slot in a circuit board or a guide structure with a slot for accommodating the flexible blade. Thus the blade serves as a "return-to-center" biasing element that flexes when the finger-engagable member (e.g., scroll wheel) is tilted such that upon release of the tilt force, the stored force of the flex of the blade returns the wheel to the upright position.

In another aspect, the finger-engagable member may be associated with an axle extending from the finger-engagable member along a tilt axis. The axle may contact or be contained within a holder such as a tower or Z-carrier. The holder may be fitted for the axle such that the corresponding shape of an opening in the holder for holding the axle and the shape of the cross section of the axle prevent excessive pivoting of the finger-engagable member.

BRIEF DESCRIPTION OF THE DRAWINGS

FIG. 7 is a front view of the scroll wheel assembly illustrating aspects of the tilt axis and light path for rotation detection.

FIG. 8 is a side view of the scroll wheel assembly of FIG. 7.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
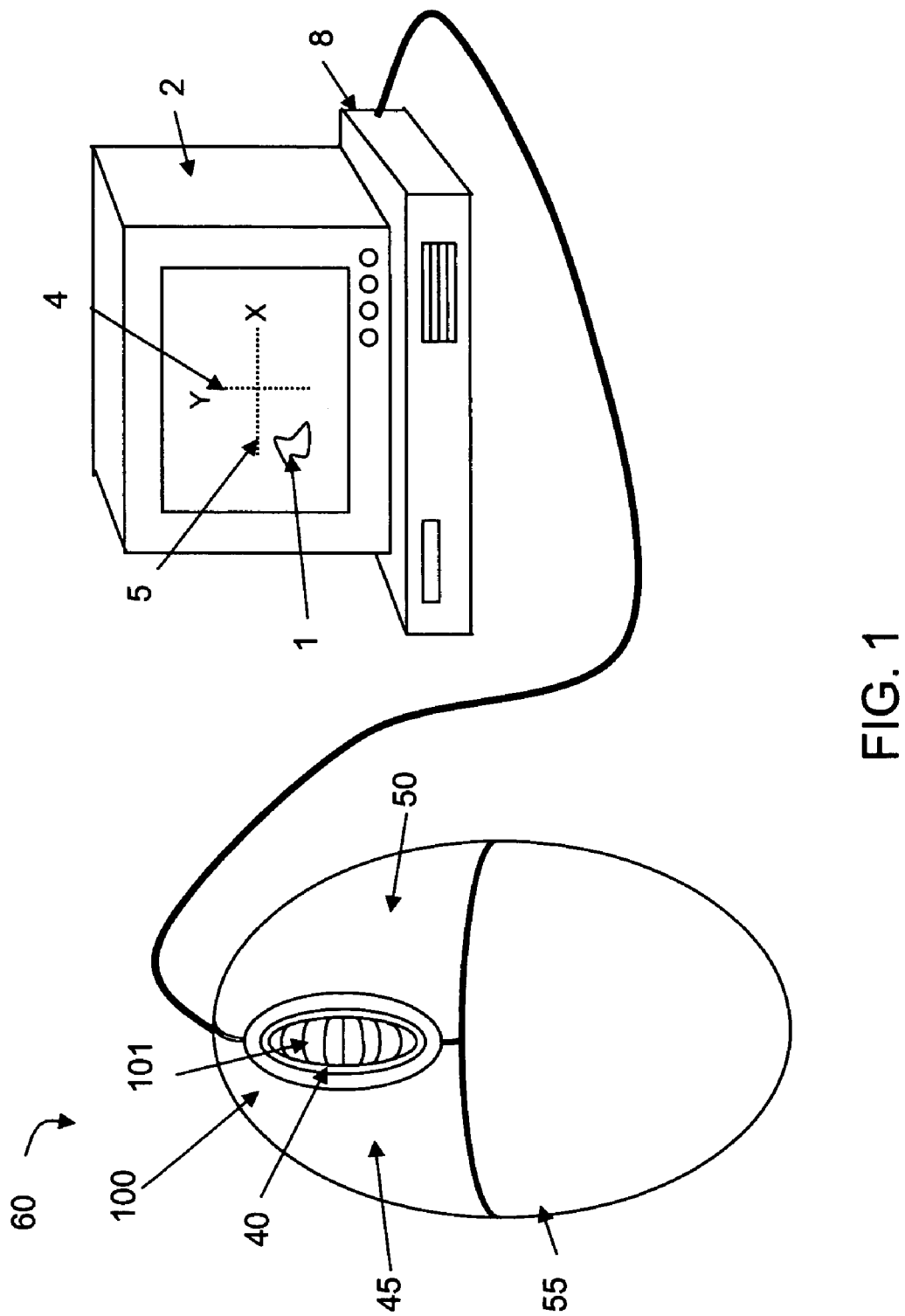
FIG. 1 is a perspective drawing illustrating an example of a computer input device of the present invention.

FIG. 1 illustrates an example of a computer input device including a scroll wheel assembly 100 having a finger-engagable control member 101 (e.g., scroll wheel) that can be used with different types of computer input devices for scrolling an image in multiple directions and along multiple axes (X, Y) relative to a display screen 2 used with a host computer 8, another type of computing device, or an internet appliance. As shown in FIG. 1, one embodiment of the scroll wheel assembly 100 according to the present invention can be located within a mouse 60. Alternatively, the scroll wheel assembly 100 can be located within a keyboard or within other peripheral, computer input devices such as a trackball device or a similar input device (not shown). For example, the scroll wheel assemblies could also be located in the bezel of a hand-held computer, a larger portable computing device, a web pad, or Internet appliance, or could be located on the chassis of a laptop computer. These other known peripheral devices can have wired or wireless connections to the host computer 8 as is known in the art. The scroll wheel assembly 100 can alternatively be located in a computer monitor or in the base portion of a laptop computer. As described in more detail hereinafter, in addition to its normal rotational movement for vertical scrolling, the finger-engagable control member 101 may be pivoted to horizontally scroll an image on the display screen 2.

As shown in FIG. 1, a scroll wheel assembly 100 has a finger-engagable control member 101 that can be used with different types of computer input devices for scrolling an image in multiple directions and along multiple axes (X, Y) relative to a display screen (4, 5) used with a computer or another type of computing device as depicted in FIG. 1, or an internet appliance.

As shown in FIG. 1, one embodiment of the scroll wheel assembly 100 according to the present invention can be located within a mouse 60. As is known, the mouse includes a system for determining translational movement of the mouse relative to a tracking surface such that movement of a cursor on a display can be controlled by corresponding movement of the mouse. In a conventional manner, the mouse 60 also includes a housing 55 and depressible actuators such as primary key 45 and/or a secondary key 50. The housing 55 has an opening 40 therein. The scroll wheel assembly 30 is mounted within the housing 55. A portion of the finger-engagable control member 101 may be exposed by extending through the opening 40 of the input device so that it can be easily contacted and manipulated by a user. As described in more detail hereinafter, in addition to at least of portion of the scroll wheel assembly 100 being rotational front to rear or rear to front for vertical scrolling, the finger-engagable control member 101 may be pivoted laterally (i.e., tilted) to horizontally scroll an image 1 on the display screen 2, or cause another action by the computer.

While the scroll wheel is described as part of a mouse 101, the invention also includes other embodiments including the scroll wheel assembly in other devices such as a keyboard, trackball device, etc. An alternative embodiment of the scroll wheel assembly 100 can be located within a keyboard or within other computer input devices such as a trackball device or a similar input device. For example, it could also be located in the bezel of a hand-held computer, a larger portable computing device, a web pad, or Internet appliance, or could be located on the chassis of a laptop computer. Any of these computer input devices can have wired or wireless connections to the host computer as is known in the art. The scroll wheel assembly 100 can alternatively be located in a computer monitor or in the base portion of a laptop computer.

Figure 2:
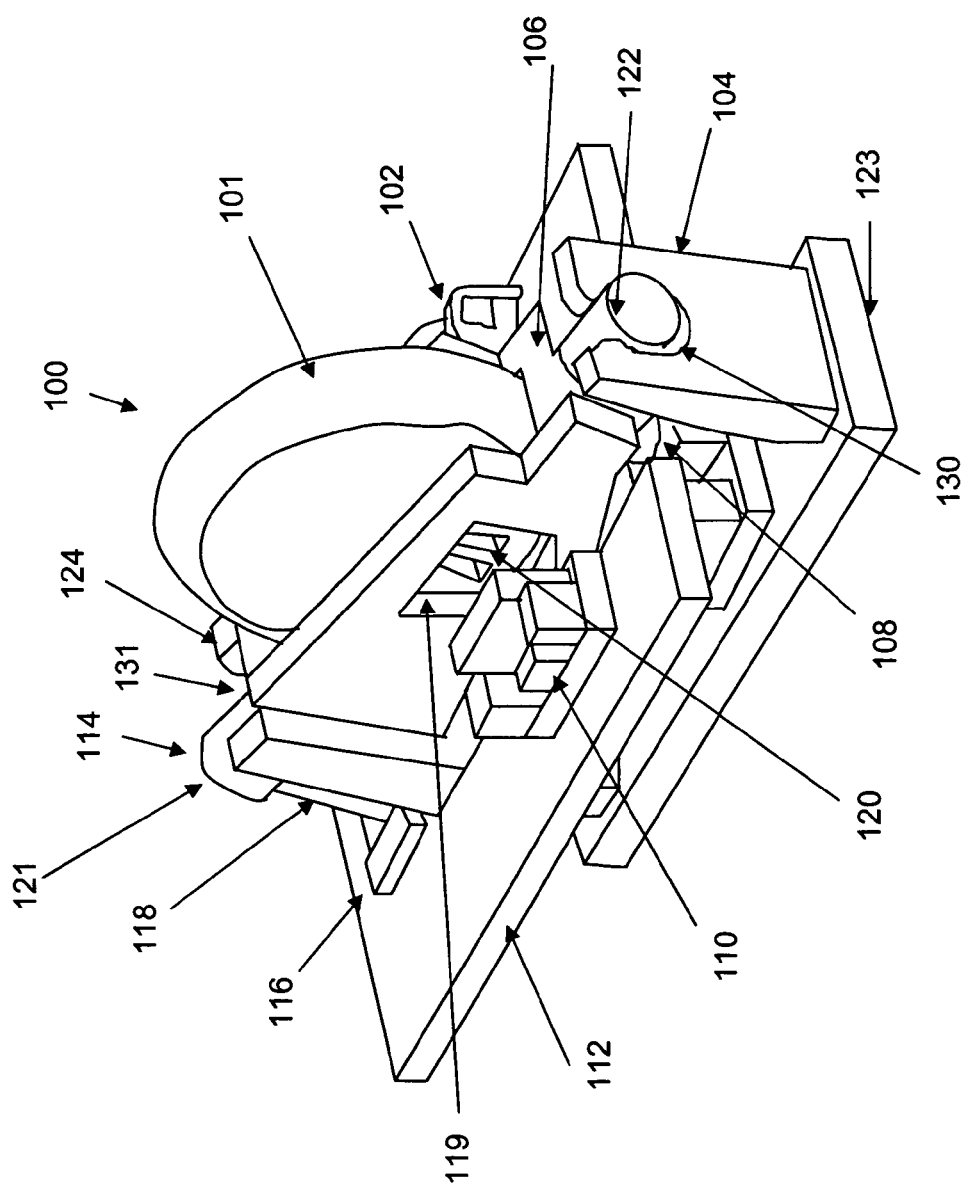
FIG. 2 illustrates the scroll wheel assembly used in the computer input device of FIG. 1.

As illustrated in FIG. 2, one example of a rotatable member of a scroll wheel assembly is a finger-engagable control member (e.g., scroll wheel) 101. The finger-engagable control member 101 may be further rotatably supported in a carriage 106 that permits the finger-engagable control member 101 to endlessly rotate relative to the carriage 106 about a laterally oriented axis. The carriage 106 surrounds at least a portion of the lower half of the finger-engagable control member 101 and leaves the upper portion of the finger-engagable control member 101 unobstructed to facilitate user manipulation.

The scroll wheel assembly 100 may contain a rotation sensing system for detecting the rotation of the finger-engagable control member 101. The rotation sensing system in this embodiment is an optical rotation sensor having a rotation sensor encoder 120, light source 102 and a light detector 110. As FIG. 2 illustrates, the light source 102 and the light detector 110 are located at opposite lateral sides of the finger-engagable control member 101. The carriage 106 contains a carriage opening 119 through which light from the light source 102 may pass.

In the example illustrated in FIG. 2, a rotation sensor encoder 120 is present within the finger-engagable control member 101 such that the rotation sensor encoder 120 rotates with the finger-engagable control member 101 to intermittently block the light from the light source 102 from the light detector 110. Thus, rotation of the finger-engagable control member 101 may be detected by detection of light passing from the light source 102 to the light detector 110 through spaced openings in the rotation sensor encoder 120 in the finger-engagable control member 101 and the carriage opening 119. Alternately, in lieu of a pass-through arrangement, the rotatable member can include alternate light absorbing and light reflecting surfaces on an encoder wheel. For example, the rotation of the finger-engagable control member 101 utilizes a reflection encoder method such that an encoder transmits lights and senses light reflected from an encoder wheel on the finger-engagable control member 101. The encoder and the encoder wheel are oriented so that the light is transmitted in a direction parallel to the axis of rotation of the finger-engagable control member 101 and the encoder wheel. The encoder wheel includes angularly spaced alternating reflective and non-reflective sections that can be distinguished by the encoder so that the angular displacement between the encoder wheel and the encoder can be determined. This contrast in light reflecting capability can be caused by etching and not etching angularly spaced regions in the side of the encoder wheel that faces the encoder. When the finger-engagable control member 101 is rotated, the non-reflective sections on the encoder wheel absorb the incident light, and the reflective sections on the encoder wheel reflect the incident light back to its light-receiving detector. The detector senses these interruptions and is coupled to a controller to generate and relay a signal to the host computer to scroll the image in the Y-direction up or down based on the amount of rotation and the direction of rotation. In such an embodiment, both elements of the optical pair are on the same side of the encoder.

Alternatively, the rotation sensor encoder may be laterally spaced from the finger-engagable control member 101. In such an arrangement, the light source and light detector of the optical pair may be located on one side of the finger-engagable control member. The encoder may attach to the finger-engagable control member through an axle at the rotating axis of the finger-engagable control member. Rotation of the finger-engagable control member causes rotation of the rotation sensor encoder which intermittently blocks passage of light from the light source to the light detector. As above, movement or rotation of the finger-engagable control member is detected and analyzed based on the intermittent light transmission pattern received at the light detector.

Figure 3:
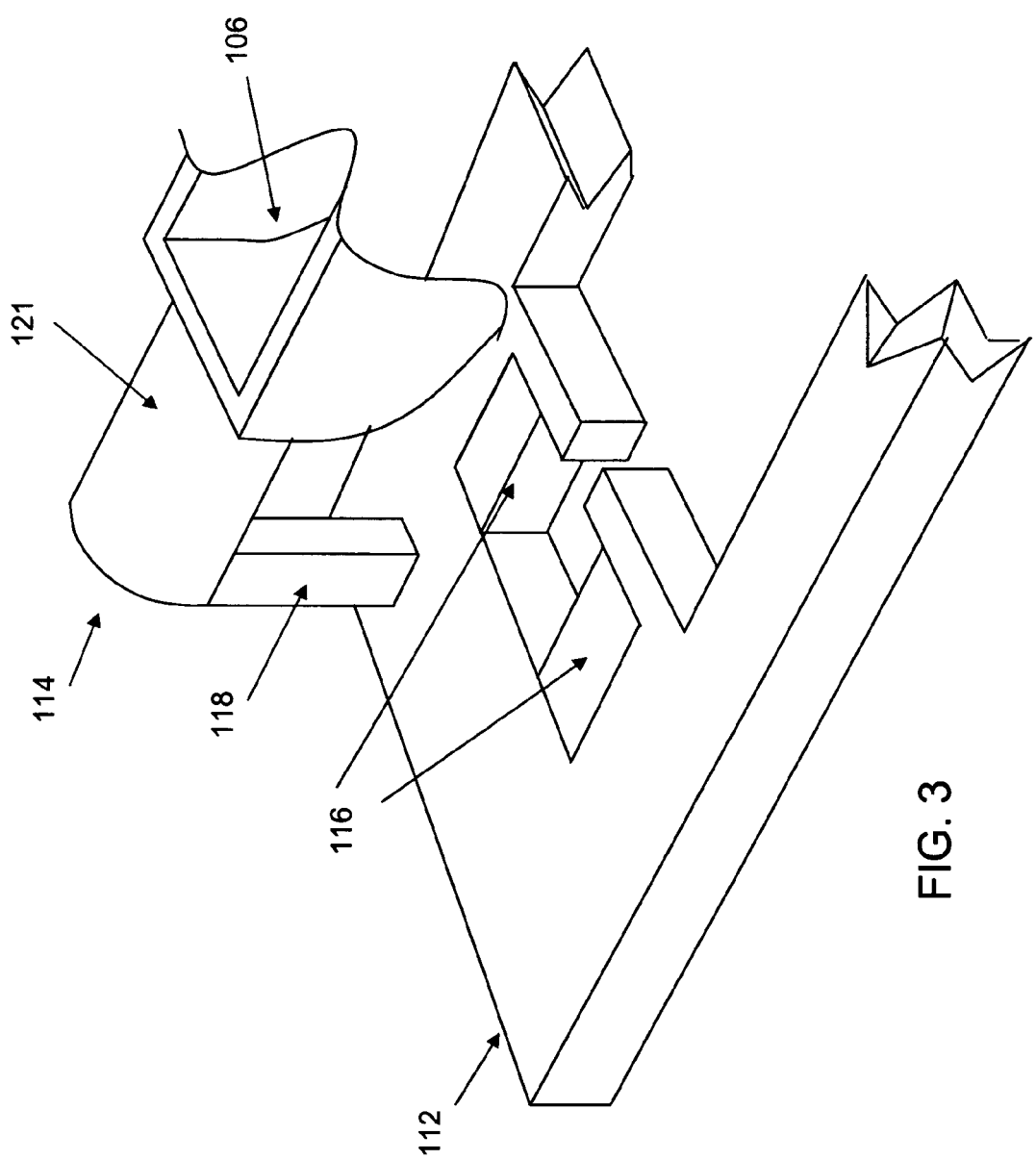
FIG. 3 is an exploded isometric view of the tilt sensor of FIG. 2.
Figure 4:
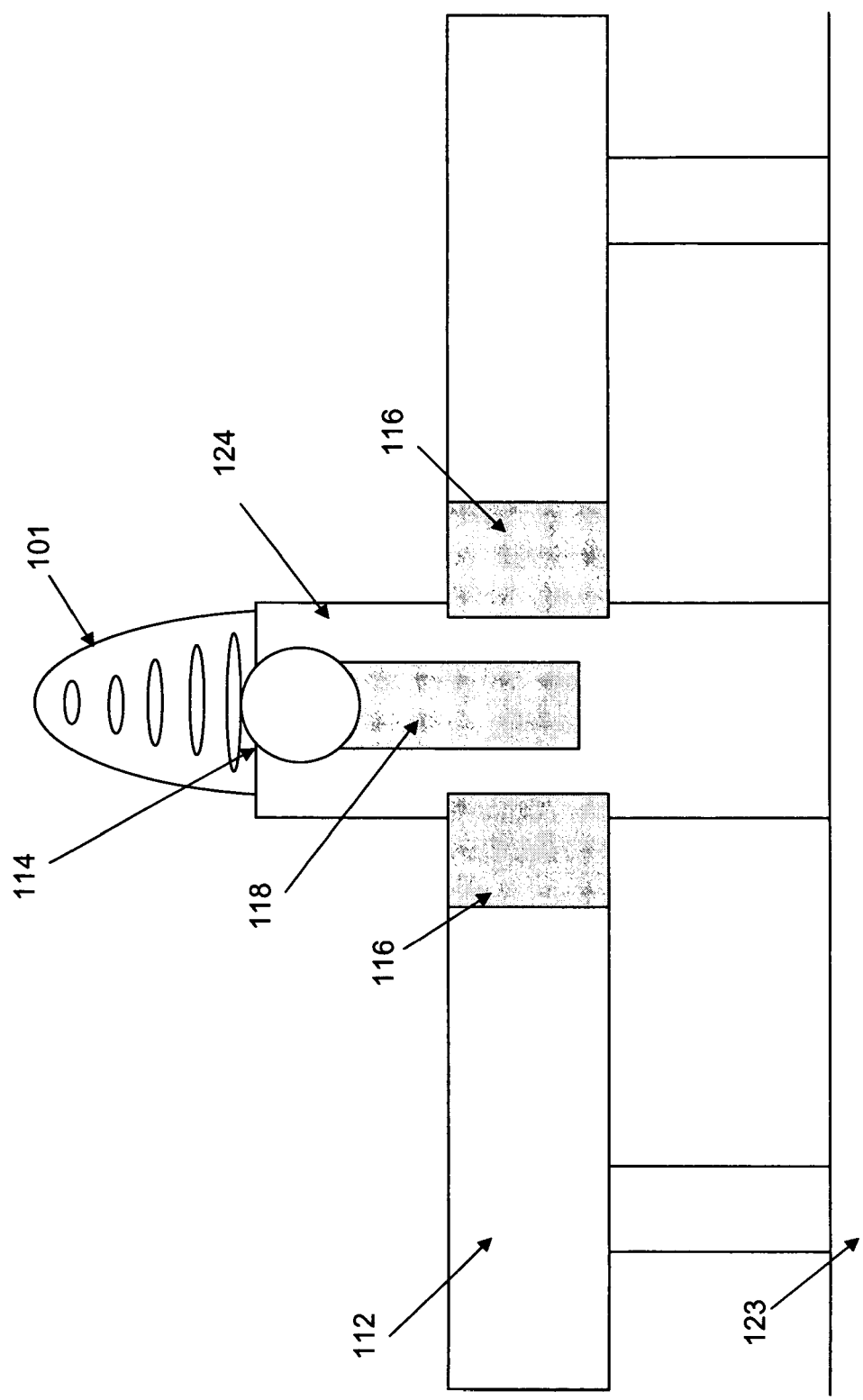
FIG. 4 is a rear view of the tilt sensor of the scroll wheel assembly of FIG. 2.

FIG. 2 illustrates a scroll wheel assembly. FIG. 3 is an exploded, isometric cutaway view of the tilt sensor of FIG. 2. FIG. 4 is a rear view of the tilt sensor of the scroll wheel assembly of FIG. 2. As illustrated in FIGS. 2-4, the finger-engagable control member 101 may further be pivoted relative to the rotation axis. In this example, the finger-engagable control member 101 has a tilt axis that extends from the front of the finger-engagable control member 101 to the rear and is perpendicular to the rotation axis. In one example, the tilt axis is coplanar with the rotation axis or may be in a plane above the rotation axis. In the example, the tilt axis lies in a plane below the rotation axis. Also, a carriage 106 may contain at least a portion of the finger-engagable control member 101. The carriage 106 may include a front axle 122, a rear axle 121, a tilt contact member 118 extending from the rear axle 121 which may be a unitary molded structure made from any suitable material, such as plastic, if desired. The front axle 122 may extend from a front aspect of the carriage along the tilt axis of the finger-engagable control member 101 through an opening 130 of an upright front stanchion 104. For example, the front axle 122 fits into an opening 130 in the upright front stanchion 104 that supports the front axle 106 to prevent downward displacement of the front section of the carrier while permitting rotation and pivoting of the finger-engagable control member 101. Also, the opening 130 in the upright front stanchion 104 provides sufficient play such that the rear section of the carrier can move in a downward direction in response to being depressed.

Also, the carriage 106 may include a rear axle 121 extending from a rear aspect of the carriage along the tilt axis of the finger-engagable control member 101 and through a slot 131 in a tower 124 such that opposing sides of the slot 131 prevent the rear axle 121 from lateral displacement relative to the tower 124. This enables the rear axle 121 to pivot within the slot 131 while preventing lateral displacement of the rear axle 121. Thus, the rear axle 121 may extend from the carriage 106 which pivots in concert with the finger-engagable control member 101.

The scroll wheel assembly 100 contains a tilt sensor 114 in which pivoting of the finger-engagable control member 101 may be detected. In this arrangement, the tilt sensor 114 contains a tilt contact member 118 that is an elongated structure extending from the rear axle 121 in a coplanar orientation with the finger-engagable control member 101. In this example, the rear axle 121 extends along the tilt axis of the finger-engagable control member 101 through the tower 124. As seen in FIG. 3, the tilt contact member 118 extends downward from the underside of the rear axle 121 at the midline such that the tilt contact member 118 extends downward and substantially perpendicular to the tilt axis.

The opening of the circuit board 112 contains tilt contact switches 116 on either side of the tilt contact member 118. When rotated, the tilt contact member 118 is disposed between two contact switches 116. In one arrangement, a hole is provided in the circuit board through which the tilt contact member 118 is located. Pivoting of the finger-engagable control member causes a corresponding rotational movement of the carriage 106 along the tilt axis, which in turn causes the rear axis to rotate a corresponding amount, which also causes the tilt contact member 118 to pivot adjacent its end and adjacent the rear axle. As this occurs, the lower part of the tilt contact member 118 will move laterally and contact the contact switch 116 on the side opposite to the direction of the tilt. The direction of pivoting of the finger-engagable control member 101 is thus detected based on the contacting of the tilt contact member 118 with a corresponding tilt contact switch 116 on the opposite side of the direction of the tilt. Specifically, tilting of the scroll wheel assembly 100 to the right causes contact of the tilt contact member 118 with the contact switch on the left and tilting of the scroll wheel assembly 100 to the left causes contact of the tilt contact member 118 with the contact switch on the right.

FIG. 4 further illustrates the tilt contact switches 116 may be located at an opening of the circuit board 112 through which the tilt contact member 118 passes. The circuit board 112 in this example is above a base 123. The orientation of the tilt contact switches 116 provide for conservation of space on the circuit board 112. The tilt contact switches 116 in this example are spaced in proximity to the tilt contact member 118 in the circuit board 112. By doing so, less space is taken by the tilt contact switches on the circuit board 112 which provides for additional space for other components as well as less restrictions in placement and arrangement of electrical components on the circuit board 112.

It should be noted that FIGS. 3 and 4 merely illustrate one example of the present invention and are not intended to limit the invention. For example, in an alternative example, the tilt contact switches 116 may be separated from the circuit board 112. In this example, the circuit board 112 may be situated lower than the tilt contact member 118 (e.g., close to the base 123) and may contain thereupon a structure for containing the tilt contact switches 116 on either side of the tilt contact member 118. In this way, placement of the circuit board 112 is not dependent on placement of the tilt contact switches 116. In another alternative example, the base 123 may contain thereon a structure for containing the tilt contact switches 116 on either side of the tilt contact member 118 in which the structure for containing the tilt contact switches 116 may pass through an opening in the circuit board 112.

Figure 9:
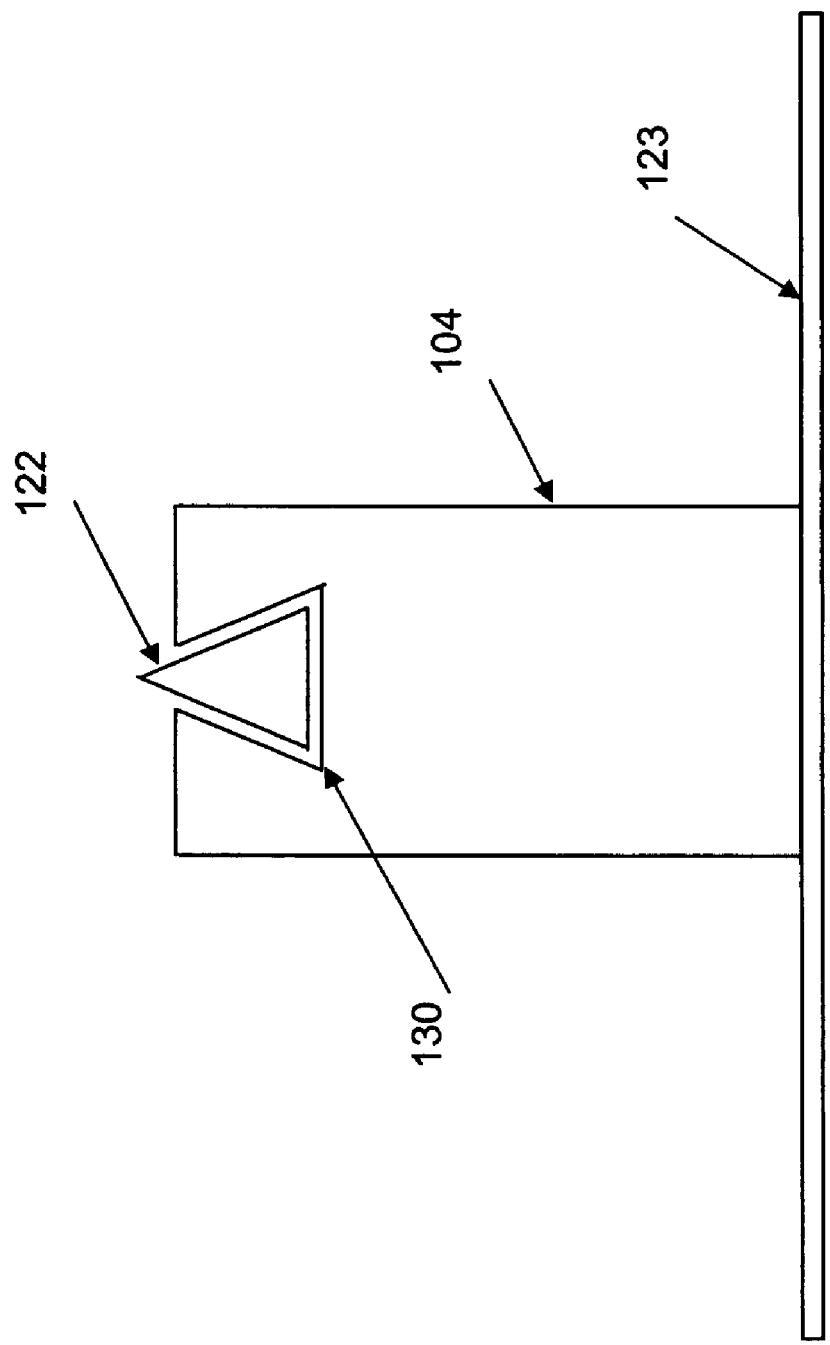
FIG. 9 is a front view of the upright front stanchion and front axle of the scroll wheel assembly of FIG. 2.

Pivoting of the finger-engagable control member 101 may be limited such that excessive pivoting is prevented. This may serve to prevent the application of excessive force to the tilt contact member 118 against the contact switch 116. For example, the cross-section of the front axle 122 extending through an opening in the upright front stanchion 104 may be of a predetermined shape relative to the opening 130 of the upright front stanchion 104 to prevent excessive pivoting. FIG. 9 shows an example of the front axle 122 with a triangular-shaped cross section within a triangular shaped opening 130 of the upright front stanchion 104. When the finger-engagable control member 100 is tilted, a force is exerted on the front axle 122 which is transmitted through the opening 130 of the upright front stanchion 104. Due to the relative shapes of the cross-section of the front axle 122 and the opening 130, the front axle 122 and opening 130 prevent excessive tilting of the finger-engagable control member 100. The relative shapes of the cross-section of the front axle 122 and the opening of the upright front stanchion 104 is not so limited, however, and may be any combination that would restrict excessive pivoting of the finger-engagable control member 101. For example, the cross-section of the front axle 122 and the opening of the Z-carrier may be oval-shaped or rectangular to provide resistance to excessive pivoting. Likewise, the cross section of the rear axle 121 and the slot 131 in the tower 124 for accommodating the rear axle 121 may also be of any combination of shapes to prevent excessive pivoting of the finger-engagable control member 101.

In use, when the user wants to scroll the image 1 on the display screen 2 (see FIG. 1) in multiple directions along multiple axes 4, 5 (see FIG. 1), he or she will both rotate and/or laterally pivot the wheel assembly 30 relative to the housing 55 to produce a signal that is interpreted by the computer to cause vertical and/or lateral scrolling, respectively. When the scroll wheel assembly 100 is rotated by the user, the rotational motion is sensed by a rotational movement sensing system (i.e., based on light from the light source 102 that is detected at the light detector 110) and the image 1 is scrolled in either a positive or a negative vertical direction that extends parallel to the Y-axis 4 (see FIG. 1), i.e., either up or down. When the scroll wheel assembly 100 is laterally tilted or pivoted by the user, the pivoting motion is sensed by a tilting sensor 114 and the image 1 (see FIG. 1) is scrolled in either a positive or a negative horizontal direction that extends parallel to the X-axis 4 (see FIG. 1), i.e., either left or right.

As described above, the scroll wheel assembly 100 may have at least two positions, i.e., a first position and a second position. The slot 131 of the tower 124 for accommodating the rear axle 121 may contain space to permit the downward motion of the finger-engagable control member 101. For example, the scroll wheel assembly 100 is in the first position when in a neutral position. However, if the finger-engagable control member 101 and carriage 106 may placed into the second position, the scroll wheel assembly 100 and carriage 106 may contact a switch underlying the scroll wheel assembly 100 (i.e., a Z-switch 108). By contacting the scroll wheel assembly 100 with the Z-switch 108, the scroll wheel assembly 100 may cause the performance of additional functions on a display screen corresponding to activation of the Z-switch. In this example, the scroll wheel assembly 101 may pivot along a second pivoting axis that is parallel to the rotating axis of the scroll wheel 101 and intersects the opening 130 of the upright front stanchion 104.

The finger-engagable control member 101 and/or the carriage 106 is biased to a neutral position (i.e., biased to a straight position relative to the opening in the housing) with respect to its potential pivoting. When a user pivots the finger-engagable control member 101, the finger-engagable control member 101 and the carriage 106 are altered from their neutral position. For example, pivoting of the finger-engagable control member 101 and the carriage 106 results in tilting of the finger-engagable control member 101 and carriage 106 along a tilt axis defined by the axles 121, 122 and that is substantially perpendicular to a rotation axis of the finger-engagable control member 101. Biasing of the carriage 106 and the finger-engagable control member 101 returns the carriage 106 and the finger-engagable control member 101 to the neutral position after removal of the tilting or pivoting force.

Figure 5B:
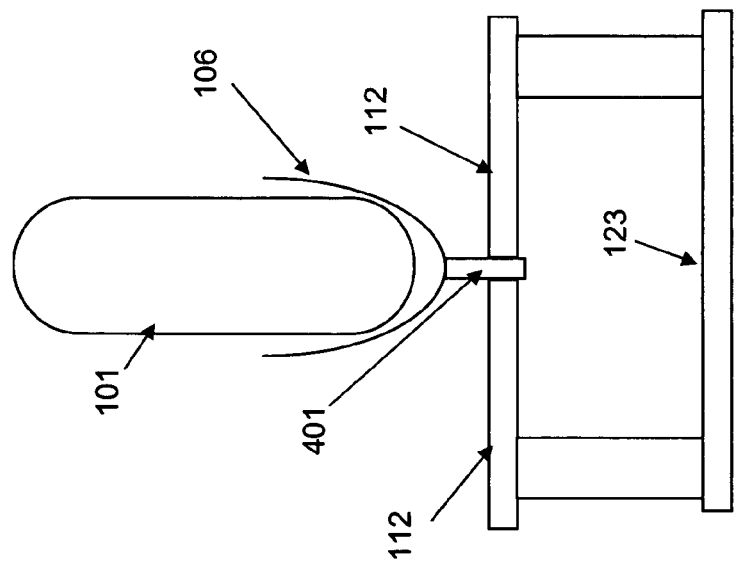
FIG. 5B is a rear view of the scroll wheel assembly and flexible blade of FIG. 5A.
Figure 5A:
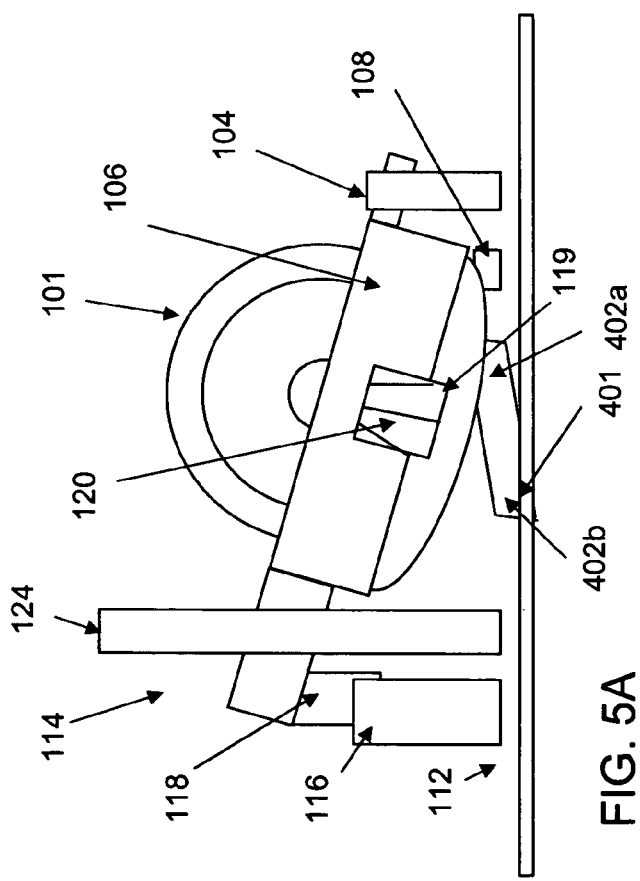
FIG. 5A is a side view of the scroll wheel assembly illustrating one example of a flexible blade.
Figure 6B:
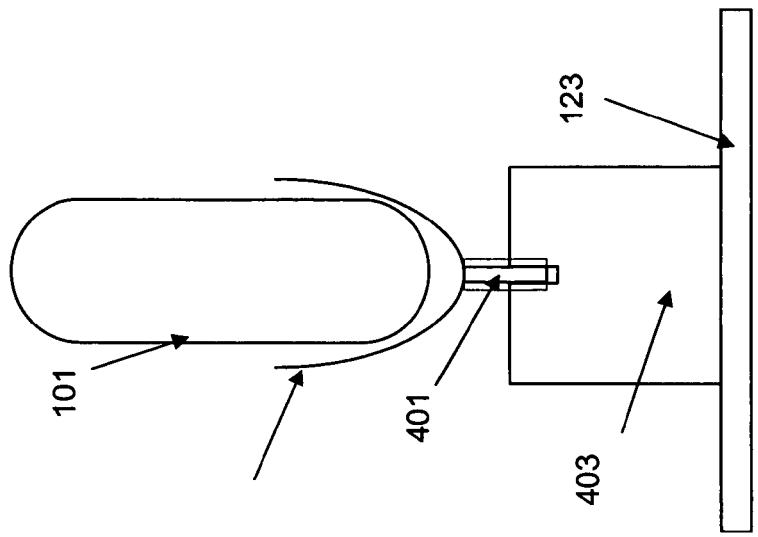
FIG. 6B is a rear view of the scroll wheel assembly and flexible blade of FIG. 5B.
Figure 6A:
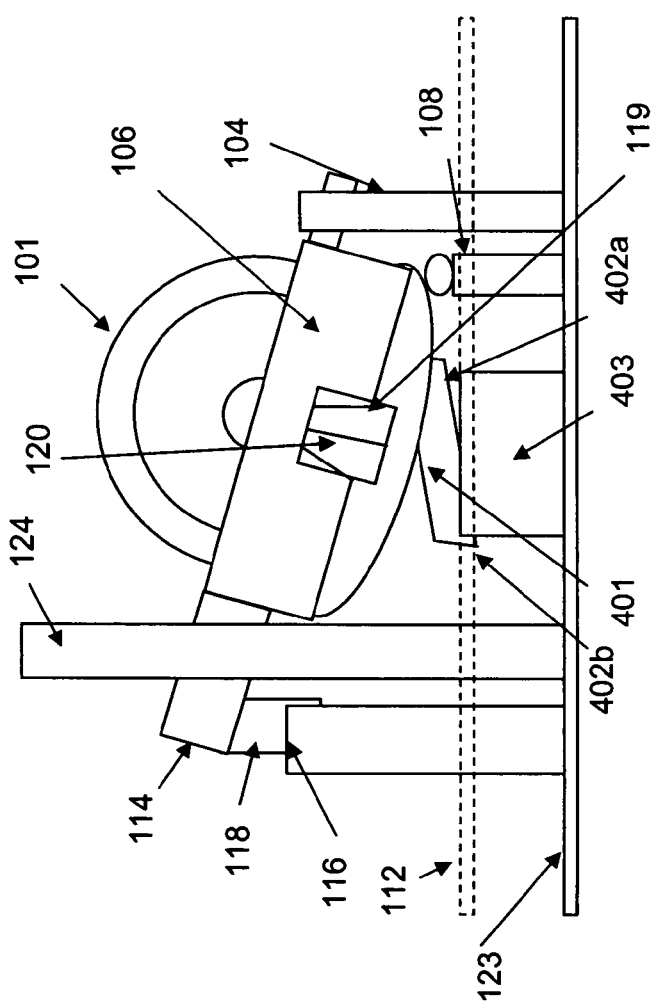
FIG. 6A is a side view of the scroll wheel assembly illustrating another example of a flexible blade.

In one example the tilt biasing device for the carriage 106 and the finger-engagable control member 101 includes a flexible blade 401. FIGS. 5A and 6A are side views of the scroll wheel assembly 100 that illustrate two examples of the use of a tilt biasing device comprising a flexible blade 401 to effect lateral biasing of the carriage 106 and/or the finger-engagable control member 101. FIGS. 5B and 6B are rear views of the scroll wheel assembly 100 with the flexible blade 401 in FIGS. 5A and 6A, respectively.

As FIGS. 5A and 5B illustrate, the scroll wheel assembly 100 may contain a flexible blade 401. In this example, the flexible blade 401 is located at an underside of the finger-engagable control member 101 or carriage 106. However, the location of the flexible blade 401 is not so limited as the flexible blade 401 may also be located in many other locations relative to the scroll wheel assembly 100. For example, the flexible blade 401 may also be located at the front or back of the finger-engagable control member 101.

The flexible blade 401 may be formed as part of the carriage. For example, the flexible blade 401 may form a unitary structure with the carriage 106 which may be molded together with the front axle 122, rear axle 121 and the tilt contact member 118. The flexible blade 401 may also be a integrated with the carriage or the finger-engagable control member 101 through a cantilever mount as a cantilever beam structure. The flexible blade 401 may be made of any solid or semi-rigid material. In this example, the flexible blade 401 is a flattened, elongated member of any semi-rigid or rigid material with a proximal end 402*a* and a distal end 402*b*. The proximal end 402*a* is placed at the midline of the finger-engagable control member 101 and oriented in a plane parallel to the longitudinal axis of the finger-engagable member 101 or carriage 106. The flexible blade 401 extends downward toward the distal end 402*b*. The proximal end 402*a* of the flexible blade 401 extends from the underside of the carriage 106 in this example to penetrate a slot in the circuit board 112 at the distal end. The proximal end 402*a* of the flexible blade 401 may be integrally molded to the carriage. The width of the slot in the circuit board 112 may be equal to the width of the flexible blade 401 such that there is minimal to no lateral displacement of the distal end 402b of the flexible blade 401 upon pivoting of the finger-engagable member 101. Alternatively, the slot in the circuit board 112 may be slightly wider than the width of the flexible blade 401 to allow for minimal lateral movement of the flexible blade 401 when the finger-engagable control member 101 is pivoted.

In use, when the finger-engagable control member 101 is pivoted in either direction, the carriage and wheel will pivot but the distal end 402b of the flexible blade 401 remains within the slot in the circuit board 112. When the pivoting force on the finger-engagable control member 101 is released, the stored force in the flexed flexible blade 401 forces the finger-engagable control member 101 and carriage 106 back to the neutral position.

FIGS. 6A and 6B illustrate an alternative example of the flexible blade in the scroll wheel assembly 100. FIG. 6A is a side view of the scroll wheel assembly 100 and FIG. 6B illustrates a rear view of the scroll wheel assembly 100. The circuit board 112 is illustrated as a dotted structure for clarity. Certain elements are not illustrated in FIG. 6B for clarity. This example is similar to the example illustrated in FIGS. 5A and 5B except the distal end of the flexible blade 401 extends into a guide slot in a guide 403 instead of a slot in the circuit board. The guide 403 is provided on a base 123 and situated preferably in the midline of and underlying the finger-engagable control member 101 and the carriage 106 and contains a slot that engages the the flexible blade 401. The slot of the guide 403 may have a width equal to the width of the flexible blade 401 or may be slightly wider than the width of the flexible blade 401 to allow minimal lateral movement of the flexible blade.

In another example, the detection and characterization of rotation of the finger-engagable member 101 does not substantially impact the detection and characterization of pivoting of the finger-engagable member 101. FIGS. 7 and 8 illustrate an example of a scroll wheel assembly 100 in which detection and characterization of both rotation and pivoting of the finger-engagable control member 101 may be accomplished without interference of either movement on the other. For example, as described in the examples above, if the finger-engagable control member 101 is rotated, the rotation is accurately detected through, for example, an optical rotation sensor by detecting light at a light detector 110 emitted from a light source 102 through a rotation sensor encoder 120. Also as described in the examples above, if the finger-engagable control member 101 is pivoted, the pivoting may be detected, for example, by a tilt sensor 114 in which a centrally placed tilt contact member 118 is laterally displaced to contact a tilt contact switch 116.

FIGS. 7 and 8 illustrate details in which the finger-engagable control member 101 is simultaneously pivoted and rotated. In this example, a tilt axis 601 of the finger-engagable member 101 and carriage 106 extends from the front to the back of the finger-engagable member 101. The optical pair including a light source 102 and a light detector 110 is used to detect rotation of the finger-engagable member 101 as was previously described. The light source 102 and the light detector 110 are located on opposite sides of the encoder in the finger-engagable member 101 such that the light from the light source 102 passes through the finger-engagable control member 101 (and an opening in the carriage 106) along an optical axis 702 (i.e., light trajectory path) to reach the light detector 110. In this example, the optical axis 702 is aligned with the tilt axis 601. The optical axis 702 may be proximate to the tilt axis 601. For example, the optical axis may be approximately 3 mm from the tilt axis or within 3 mm from the tilt axis. The optical axis may alternatively be 1 mm from the tilt axis. In another example, the optical axis 702 may be less than 1 mm from the tilt axis. Also, the optical axis 702 may intersect the tilt axis 601. As FIG. 7 illustrates, the tilt axis 601 (depicted as "X") intersect the optical axis 702 (depicted as a block arrow in FIG. 7 and as a "+" in FIG. 8). This arrangement minimizes or eliminates interference of rotation detection function based on of the finger-engagable control member 101 around the tilt axis 601.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

We claim:

1. An input device for scrolling an image relative to an image display screen along perpendicular axes, the device comprising:
   a housing including an upper surface having at least one opening and a lower surface adapted for movement along a tracking surface; and
   a scroll wheel assembly provided within the housing, the scroll wheel assembly including a finger-engagable rotatable member that is positioned within the opening, the finger-engagable rotatable member being endlessly rotatable about a first axis extending within the housing and the finger-engagable rotatable member being pivotally movable about a second axis, the first axis being substantially perpendicular to the second axis; and
   a tilt sensing system that determines when the finger-engagable rotatable member is pivoted about the second axis relative to the housing, the tilt sensing system including a tilt contact member extending between the second axis and the lower surface;
   two contact switches located on opposite sides of the tilt contact member; and
   a return to center device configured to return the finger-engagable rotatable member to a neutral position, the return to center device including a flexible blade having a proximal end and a distal end, the proximal end being operatively connected to the finger-engagable rotatable member.

2. The device of claim 1 further comprising an axle extending along the second axis wherein the tilt contact member comprises a first end and a second end, the first end being attached to the axle.

3. The device of claim 2 wherein the two contact switches are located at an edge of an opening in a circuit board.

4. The device of claim 3 wherein the tilt contact member is displaced laterally in a first direction when the finger-engagable rotatable member is pivoted about the second axis in a second direction, the first direction being opposite to the second direction.

5. The device of claim 4 wherein the tilt contact member is substantially vertically oriented and contacts at least one contact switch when the finger-engagable rotatable member is pivoted about the second axis and pivoting of the finger-engagable rotatable member is detected based on contact of the tilt contact member with the contact switch.

6. The device of claim 1 wherein the finger-engagable rotatable member includes an outer peripheral radial surface and an inner radial surface, the inner radial surface defining a radial edge of a central hollow internal area of the finger-engagable rotatable member, the finger-engagable rotatable member further comprising a rotation sensor encoder positioned within the central hollow internal area of the finger-engagable rotatable member for sensing rotation of the finger-engagable control member.

7. The device of claim 1 further comprising a rotation sensor for detecting rotation of the finger-engagable rotatable member, the rotation sensor comprising a light source and a light detector, wherein the light source emits a light over a light path over a third axis to the light detector, the third axis within 3 mm of the second axis and being perpendicular to the second axis and parallel to the first axis.

8. The device of claim 7 wherein the light source is at a first lateral aspect of the finger-engagable rotatable member and the light detector at a second lateral aspect of the finger-engagable rotatable member wherein the first lateral aspect and the second lateral aspect are on opposite sides of the finger-engagable rotatable member.

9. The device of claim 8 wherein the light path traverses the rotation sensor encoder in the central hollow internal area of the finger-engagable rotatable member.

10. The device of claim 7 wherein the third axis intersects the second axis.

11. An input device for scrolling an image relative to an image display screen along perpendicular axes, the device comprising:
a housing including an upper surface having at least one opening and a lower surface adapted for movement along a tracking surface; and
a scroll wheel assembly provided within the housing, the scroll wheel assembly including a finger-engagable rotatable member that is positioned within the opening, the finger-engagable rotatable member being endlessly rotatable about a first axis extending within the housing and the finger-engagable rotatable member being pivotally movable about a second axis, the first axis being substantially perpendicular to the second axis; and
a return to center device configured to return the finger-engagable rotatable member to a neutral position, the return to center device including a flexible blade having a proximal end and a distal end, the proximal end being operatively connected to the finger-engagable rotatable member.

12. The device of claim 11 further comprising a carriage, the finger-engagable rotatable member being disposed in the carriage wherein the flexible blade is integrally molded to the carriage, wherein the proximal end of the flexible blade is integrally molded to the carriage.

13. The device of claim 12, wherein the distal end of the flexible blade being lower than the proximal end of the flexible blade and extends between at least two lateral supports.

14. The device of claim 13 wherein the input device includes a circuit board having an aperture, the at least two lateral supports being edges of the aperture of the circuit board.

15. The device of claim 13 wherein the flexible blade is attached to the finger-engagable rotatable member through a cantilever mount.

16. The device of claim 13 wherein the flexible blade is coplanar with the finger-engagable member and extends in a vertical direction from a midpoint between lateral aspects of the finger-engagable member.

17. The device of claim 16 wherein the distal end of the flexible blade extends into a structure underlying the finger-engagable member, the structure located on the lower surface of the housing and for restricting lateral movement of the flexible blade.

18. The device of claim 17 wherein the distal end of the flexible blade remains in the structure when the finger-engagable member is pivoted.

* * * * *